Patented Jan. 17, 1939

2,143,855

UNITED STATES PATENT OFFICE 2,143,855

ALKALI CELLULOSE

Shailer L. Bass, Midland, Mich., assignor to The Dow Chemical Company, Midland, Mich., a corporation of Michigan No Drawing. Application October 23, 1937, Serial No. 170,649

2 Claims. (Cl. 260—233)

This invention relates to alkali cellulose and especially to an alkali cellulose adapted to the production of low viscosity cellulose ethers.

The type of cellulose ethers considered most desirable in the preparation of coating compositions are those which will dissolve in lacquer solvents, to form highly concentrated solutions which have, however, as low a viscosity as possible. The lower the intrinsic viscosity of the cellulose derivative, the more concentrated are solutions prepared therefrom for any given solution viscosity. It has long been the practice to prepare cellulose ethers from alkali cellulose without special regard to the viscosity characteristics of the cellulose from which the alkali cellulose is prepared. Such ethers ordinarily possess higher intrinsic viscosity than can satisfactorily be employed in spraying lacquers and similar coating compositions. To overcome this difficulty, it has been the practice to effect a viscosity reduction of the cellulose ether by treatment thereof with acids. Such treatment, while resulting in viscosity reduction, has the disadvantage of producing cellulose ethers which are relatively unstable, especially at elevated temperatures, and which, when deposited in the form of films are weak and often brittle. Another process which has been employed to provide low viscosity cellulose ethers comprises preparing an alkali cellulose without regard to the initial viscosity of the cellulose therein and subsequently aging the alkali cellulose until the cellulose viscosity has been reduced to the required level.

It is an object of the present invention to provide a way of making a low viscosity alkali cellulose from which low viscosity cellulose ethers may be prepared directly by an etherification reaction, said ethers having a low intrinsic viscosity and being readily adapted to application in spraying lacquers and similar coating compositions. It is a further object to provide a method whereby an alkali cellulose may be prepared, without undesirable degradation of the cellulose, which will have the lowest viscosity possible for any alkali cellulose prepared from the particular type of cellulose employed.

The most satisfactory cellulose ether for the preparation of films and for use in coating compositions, and the like, is one containing 2 or more etherifying substituents per glucose unit. In order to obtain such an ether by the etherification of alkali cellulose with an alkyl halide or alkyl sulphate, it has been found necessary to employ an alkali cellulose wherein the alkali and water content corresponds in proportion to an alkali solution of from 60 to 80 per cent concentration.

I have now found that, when cellulose is brought into contact with sodium hydroxide solutions of from 60 to 80 per cent concentration, a maximum viscosity reduction of the cellulose occurs for any given temperature of impregnation, when the alkali concentration is between 65 and 70, and preferably about 67.5 per cent. This result was entirely unexpected, since it would ordinarily be predicted that a progressively reduced viscosity of cellulose would be obtained as the alkali concentration increases. The following table illustrates the effect upon cellulose viscosity of immersing cellulose in sodium hydroxide solutions of various concentrations at each of several temperatures. All viscosity determinations were made on samples of alkali cellulose one minute after removing such alkali cellulose from the sodium hydroxide bath. The measurements were made on 3 per cent solutions of carefully washed alkali-free samples of cellulose in a cuprammonium hydroxide reagent containing 30 grams of copper and 180 to 200 grams of ammonia per liter. The viscosity of the original cellulose pulp employed in the experiments reported below, when determined on a comparable basis, was 496 centipoises.

|  | 80° C. | 100° C. | 120° C. | 140° C. |
|---|---|---|---|---|
| 56.5% NaOH | 230 | 115 | 77 | |
| 62.5% NaOH | 105 | 90 | 65 | 53 |
| 67.5% NaOH | 63 | 43 | 38 | 33 |
| 72.5% NaOH | 155 | 105 | 70 | 50 |
| 77.0% NaOH | (*) | (*) | 92 | 75 |

* Alkali bath solid at this temperature.

Reference to the foregoing table indicates clearly that the minimum cellulose viscosity obtainable for any temperature of immersion in an alkali bath is obtained employing alkali solutions of approximately 67.5 per cent sodium hydroxide content.

The advantages inherent in employing a 67.5 per cent alkali solution in the preparation of alkali cellulose may be obtained regardless of the mode of preparation of the alkali cellulose so long as the alkali and water ratios employed in preparing the alkali cellulose are such as correspond to a 67.5 per cent sodium hydroxide solution.

In carrying out my invention, a quantity of cellulose is subjected to the action of an aqueous sodium hydroxide solution having a caustic concentration between about 65 and about 70 per cent by weight, said solution being preferably maintained at a temperature in the range between about 90° and 120° C. The time of contact between the cellulose and the alkali solution should be such that the cellulose absorbs between about 1.25 and 3.2 times its weight of alkali solution. The cellulose fiber aggregate has the appearance of being just wet throughout with alkali solution. The alkali cellulose so produced is thereafter removed from the alkali solution and may be worked up into highly etherified water-insoluble cellulose ethers by any of the usual procedures for etherifying alkali cellulose.

It is an advantage of the present invention that little, if any, aging is required to bring the cellulose in the alkali cellulose to a sufficiently low viscosity so that the preferred type of low viscosity cellulose ethers may be formed. The aging step heretofore employed is almost invariably accompanied by oxidation and partial degradation of the cellulose molecule. This may be overcome by preparing an alkali cellulose with a 65–70 per cent, preferably a 67.5 per cent sodium hydroxide solution, thereby obtaining directly a low viscosity cellulosic product from which low viscosity ethers may be formed.

I claim:

1. In a process for the preparation of an alkali cellulose adapted to the production of low viscosity water-insoluble cellulose ethers, the steps which consist in immersing cellulose in a bath of liquid sodium hydroxide having a sodium hydroxide concentration between 65 and 70 per cent, at a temperature of about 90° to 120° C., holding the cellulose in contact with the said liquid alkali only until the cellulose has absorbed between about 1.25 and 3.2 times its weight of the alkali solution, at which time the cellulose aggregate has the appearance of being just wet throughout with alkali solution, and then removing the alkali-cellulose from the bath.

2. In a process for the preparation of an alkali cellulose adapted to the production of low viscosity water-insoluble cellulose ethers, the steps which consist in immersing cellulose in a bath of liquid 67.5 per cent sodium hydroxide, at a temperature of about 90 to 120° C., holding the cellulose in contact with the said liquid alkali only until the cellulose has absorbed between about 1.25 and 3.2 times its weight of the alkali solution, at which time the cellulose aggregate has the appearance of being just wet throughout with alkali solution, and then removing the alkali-cellulose from the bath.

SHAILER L. BASS.